(12) United States Patent
Kim et al.

(10) Patent No.: US 6,614,493 B1
(45) Date of Patent: *Sep. 2, 2003

(54) LIQUID CRYSTAL DISPLAY AND METHOD OF MANUFACTURING THE SAME

(75) Inventors: Jeong-Hyun Kim, Kyunggi-do (KR); Jae-Yong Park, Kyunggi-do (KR); Woong-Kwon Kim, Kyunggi-do (KR); Kyoung-Nam Lim, Seoul (KR); Sung-Il Park, Taegu-shi (KR)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,033

(22) Filed: Nov. 10, 1997

(30) Foreign Application Priority Data

Nov. 27, 1996 (KR) .............................. 96/57881

(51) Int. Cl.⁷ .......................... G02F 1/136; G02F 1/141
(52) U.S. Cl. ........................................ 349/43; 349/138
(58) Field of Search .................... 349/42, 43, 139, 349/140, 148; 257/57, 59, 72

(56) References Cited

U.S. PATENT DOCUMENTS

| | | | | |
|---|---|---|---|---|
| 4,332,075 A | * | 6/1982 | Ota et al. | 257/59 |
| 4,636,038 A | | 1/1987 | Kitahara et al. | 350/339 |
| 5,084,905 A | * | 1/1992 | Sasaki et al. | 357/71 |
| 5,166,085 A | * | 11/1992 | Wakai et al. | 437/40 |
| 5,229,644 A | | 7/1993 | Wakai et al. | 257/749 |

(List continued on next page.)

FOREIGN PATENT DOCUMENTS

| | | |
|---|---|---|
| JP | 63-279228 | 11/1988 |
| JP | 63-289965 | 11/1988 |
| JP | 01-293318 | 11/1989 |
| JP | 03-036039 | 2/1991 |
| JP | 04-068318 | 3/1992 |
| JP | 04-163528 | 6/1992 |
| JP | 04-363020 | 12/1992 |

OTHER PUBLICATIONS

Wolf et al., Silicon Processing for the VLSI Era, vol. 1, Lattice Press, pp. 407–409, 1986.*

M.J. Radler et al., *Cyclotene™ to Advanced Electronics Resins for High–Aperture AMLCD Applications*, SID 96 Applications Digest, pp. 33–36 (1996).

D.J. Perettie et al., *Benzocyclobutene as a Planarization Overcoat for Flat Panel Displays*, ASia Display '95, pp. 721–724 (1995).

Toshihara Ueki et al., *Dye embedded BM resin and three dimensional picture element implemented by BM on Array technology for the first time*, Nikkei Microdevices, pp. 60–62 (Jul. 1994).

*Primary Examiner*—Robert H. Kim
*Assistant Examiner*—Dung Nguyen
(74) *Attorney, Agent, or Firm*—Morgan, Lewis & Bockius LLP

(57) ABSTRACT

A method is provided for manufacturing a liquid crystal display having a gate bus line, a data bus line, and a switching element with a drain electrode on a substrate. The method includes the steps of forming a protection layer over the substrate to cover the gate bus line, the data bus line, and the switching element, depositing a first layer on the protection layer, the first layer having a thermal expansion coefficient smaller than that of the protection layer, and depositing a second layer on the first layer, the second layer having a thermal expansion coefficient substantially consistent with that of the first layer. The method further includes the steps of removing portions of the second layer on the first layer to form a desired pattern of the second layer, removing portions of the first layer using the patterned second layer as a mask to form a desired pattern of the first layer, and removing the second layer remaining on the patterned first layer.

12 Claims, 5 Drawing Sheets

U.S. PATENT DOCUMENTS

| | | | | |
|---|---|---|---|---|
| 5,478,766 A | * | 12/1995 | Park et al. | 437/40 |
| 5,502,889 A | * | 4/1996 | Casson et al. | 252/511 |
| 5,641,974 A | | 6/1997 | den Boer et al. | 257/59 |
| 5,646,432 A | * | 7/1997 | Iwaki et al. | 257/347 |
| 5,731,216 A | * | 3/1998 | Holmberg et al. | 437/40 |
| 5,751,381 A | * | 5/1998 | Ono et al. | 349/42 |
| 5,757,453 A | * | 5/1998 | Shin et al. | 349/122 |
| 5,771,083 A | * | 6/1998 | Fujihara et al. | 349/148 |
| 5,894,136 A | * | 4/1999 | Wook | 349/139 |
| 5,907,382 A | * | 5/1999 | Kajiura et al. | 349/158 |

* cited by examiner

LIQUID CRYSTAL DISPLAY AND METHOD OF MANUFACTURING THE SAME

This application claims the benefit of Korean Application No. P96-57881, filed on Nov. 27, 1996, which is hereby incorporated by reference.

BACKGROUND OF THE INVENTION

1. Field of the Invention

The present invention relates to a liquid crystal display and a method of manufacturing the same, and more particularly, to a liquid crystal display which has reduced defects in patterning a pixel electrode connected to a thin film transistor (TFT) and a method of manufacturing the same.

2. Discussion of the Related Art

With reference to FIG. 1, a conventional liquid crystal display is described. A gate bus line 17 is formed in the horizontal direction on a substrate, and a gate electrode 17a is branched off from the gate bus line 17. A data bus line 15 is formed in the vertical direction on the substrate, and a source electrode 15a is branched off from the data bus line. A TFT is formed at the cross-section between the source electrode 15a and the gate electrode 17a, and a drain electrode of the TFT is formed to be connected to a pixel electrode 4.

More detailed structure of the conventional liquid crystal display is described in FIGS. 2 and 3 taken along lines II—II and III—III in FIG. 1, respectively, which show the cross-sectional structures of the TFT and the data bus line. Referring to FIG. 1, the gate electrode 17a branched off from the gate bus line 17 is formed on a transparent substrate 11. The gate electrode 17a is anodic oxidized, forming an anodic oxide layer 35 to improve the insulation property and to prevent hillocks. A gate insulating layer 23 made of an inorganic insulating material, such as $SiN_x$ or $SiO_x$, is formed over the surface of the substrate including the gate electrode 17a. A semiconductor layer 22 made of an amorphous silicon is formed on the gate insulating layer 23 to cover the gate electrode 17a. An ohmic contact layer 25 is formed on the semiconductor layer 22. A source electrode 15a branched off from the data bus line and a drain electrode 15b are formed on the ohmic contact layer 25, and are separated from each other at a predetermined distance. A protection layer 26 made of an organic insulating material, such as benzocyclobutene (BCB), is formed to cover the source electrode 15a and the drain electrode 15b. A portion of the organic protection layer 26 is removed to form a drain contact hole. A pixel electrode 4 is formed of a transparent conductive material, such as indium tin oxide (ITO), on the organic protection layer 26 to be connected with the drain electrode 15b through the drain contact hole. The portions A and B in FIGS. 1 and 2 represent the over-etched portions of the pixel electrode 4.

Referring to FIG. 3, a data bus line 15 is formed on the gate insulating layer 23 made of an inorganic insulating material, such as $SiN_x$ or $SiO_x$. The protection layer 26 made of organic insulating material, such as BCB, is formed on the substrate including the data bus line 15. The pixel electrode 4 is formed on the protection layer 26. As in FIG. 2, the portions of A and B represent the over-etched portions of the pixel electrode 4, and ① and ② represent portions where light leakage occurs due to the over-etching of the pixel electrode 4.

When indium tin oxide deposited on the organic protection layer is patterned to form the pixel electrode, detachment of the indium tin oxide layer from the organic protection layer may occur, since adhesion between the organic protection layer and the indium tin oxide layer is insufficient. Moreover, a difference in thermal expansion coefficient between the organic insulating material of BCB (50–60× $10^{-6}/°$ C.) and indium tin oxide (5–7×$10^{-6}/°$ C.) and the resultant thermal stress cause micro-cracks in indium tin oxide during the photolithography step for patterning the indium tin oxide layer. Thus, during the subsequent wet etching process of indium tin oxide, an etchant penetrates into the micro-cracks, causing excessive etching of indium tin oxide, known as "critical dimension loss (CD loss)". CD loss deteriorates contrast and quality of the liquid crystal display.

SUMMARY OF THE INVENTION

Accordingly, the present invention is directed to a liquid crystal display and method of manufacturing the same that substantially obviate the problems due to limitations and disadvantages of the related art.

An object of the present invention is to provide a liquid crystal display and a method of manufacturing a liquid crystal display for preventing over-etching of the pixel electrode during the manufacture, thereby reducing defects in the liquid crystal display and providing an improved manufacturing process of the liquid crystal display.

Another object of the present invention is to provide a liquid crystal display eliminating micro-cracks in the pixel electrode, thereby preventing the CD loss of the pixel electrode.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method of manufacturing a liquid crystal display, including the steps of sequentially depositing a first layer and a second layer on a protection layer, wherein the first layer has a thermal expansion coefficient less than that of the protection layer and wherein, the second layer has an etch rate greater than the first layer and a thermal expansion coefficient similar to or less than that of the first layer; patterning the second layer on the first layer in a desired pattern; patterning the first layer using the patterned second layer as a mask; and removing the second layer remaining on the patterned first layer.

In another aspect, the present invention provides a method of manufacturing on a substrate a liquid crystal display having a gate bus line, a data bus line, and a switching element with a drain electrode, the method including the steps of forming a protection layer over the substrate to cover the gate bus line, the data bus line, and the switching element; depositing a first layer on the protection layer, the first layer having a thermal expansion coefficient smaller than that of the protection layer; depositing a second layer on the first layer, the second layer having a thermal expansion coefficient substantially consistent with that of the first layer; removing portions of the second layer on the first layer to form a desired pattern of the second layer; removing portions of the first layer using the patterned second layer as a mask to form a desired pattern of the first layer; and removing the second layer remaining on the patterned first layer.

In a further aspect, the present invention provides a liquid crystal display, including a substrate; a gate bus line over the substrate; a data bus line over the substrate; a switching element having a drain electrode over the substrate; a protection layer covering the gate bus line, the data bus line, and the switching element over the substrate, the protection layer having a contact hole over the drain electrode; a first layer on the protection layer, the first layer being connected to the drain electrode through the contact hole and having a thermal expansion coefficient smaller than that of the protection layer; and a second layer on the first layer, the second layer having a thermal expansion coefficient substantially consistent with that of the first layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to a preferred embodiment of the present invention, a protection layer covering a gate bus line, a data bus line and a switching element is made of an organic insulating material, such as BCB, polyimide, or SOG, having the thermal expansion coefficient greater than that of an inorganic insulating material. A contact hole is formed in the protection layer to expose a drain electrode of the switching element. A pixel electrode is formed on the protection layer, which is connected with the drain electrode through the contact hole. When the pixel electrode is formed, indium tin oxide and an inorganic insulating material are sequentially deposited on the protection layer. The inorganic insulating material is patterned and then the indium tin oxide is patterned using the patterned inorganic insulating material as a mask. Subsequently, the inorganic insulating material remaining on the indium tin oxide is removed.

Figure 1:
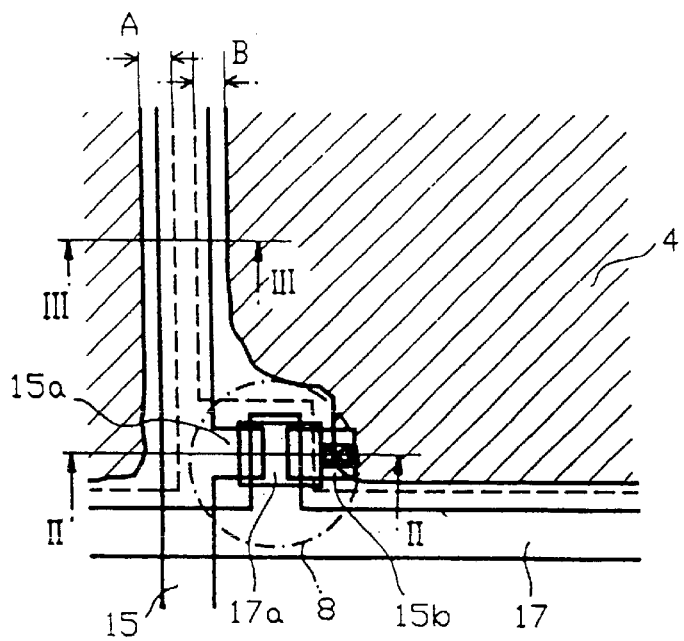
FIG. 1 is a plan view showing a conventional liquid crystal display.
Figure 2:
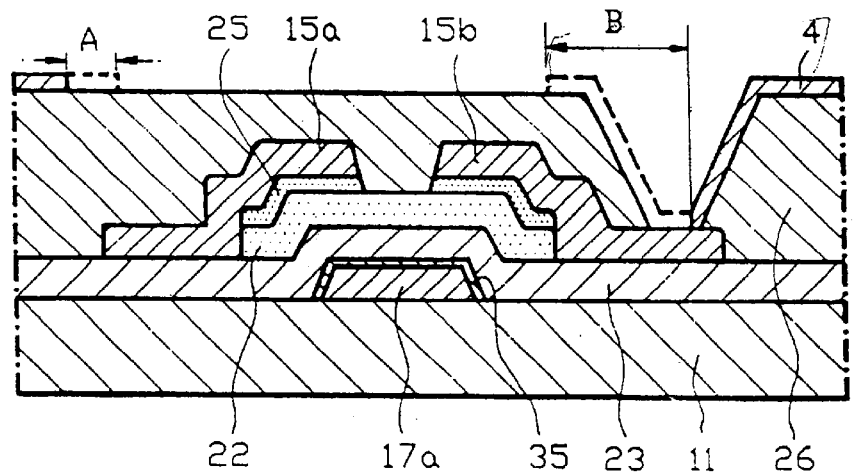
FIGS. 2 and 3 are cross-sectional views of the conventional liquid crystal display.
Figure 3:
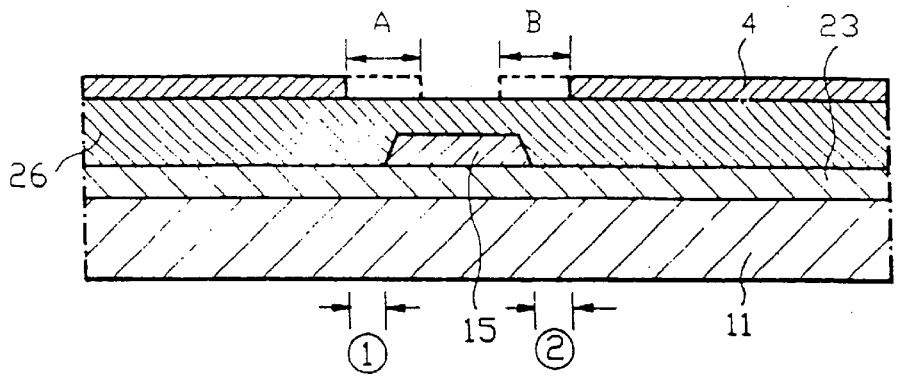
Figure 4:
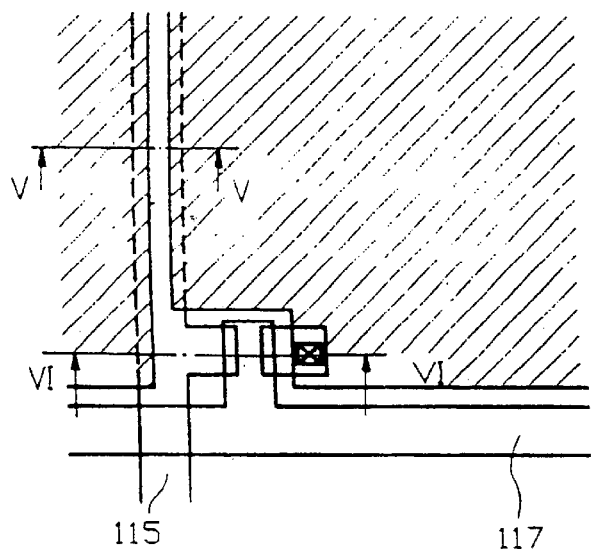
FIG. 4 is a plan view of a liquid crystal display according to a preferred embodiment of the present invention.
Figure 5:
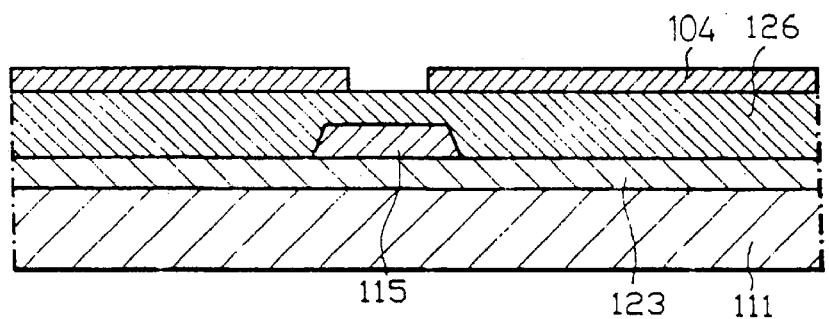
FIG. 5 is a cross-sectional view of the liquid crystal display according to the preferred embodiment of the present invention.

With reference to FIGS. 4, 5, and 6a–6i, the preferred embodiment of the present invention is described in more detail. FIG. 4 is a plan view of a liquid crystal display according to the preferred embodiment of the present invention. FIG. 5 is a cross-sectional view taken along line V—V of FIG. 4. FIGS. 6a to 6i are cross-sectional views taken along line VI—VI of FIG. 4, showing manufacturing steps of the liquid crystal display according to a preferred embodiment of the present invention.

Figure 6A:
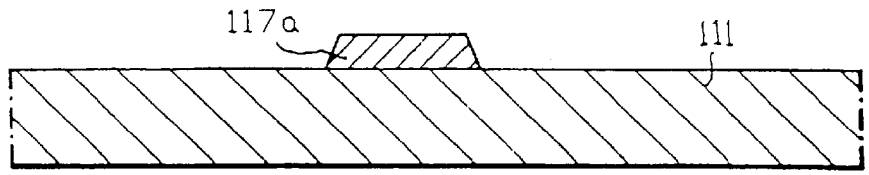
FIGS. 6a to 6i are cross-sectional views showing manufacturing steps of the liquid crystal display according to a preferred embodiment of the present invention.
Figure 6B:
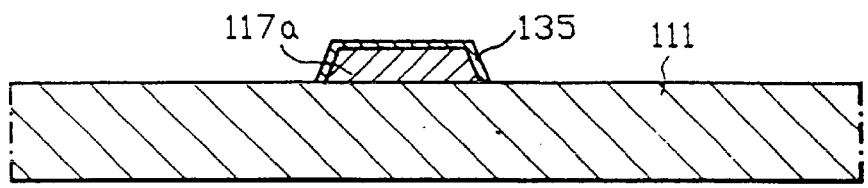

Metal, such as aluminum, aluminum alloy, chromium, or molybdenum, is vacuum-deposited on a transparent substrate 111. A photoresist is coated on the metal layer and is developed into a predetermined pattern. According to the predetermined photoresist pattern, the metal layer is removed by wet etching to form a gate bus line 117 and a gate electrode 117a branched off from the gate bus line 117. At this time, it is preferred for the gate electrode 117a to be tapered to relieve the stepped profile (FIG. 6a). Then, the gate electrode 117a is anodic oxidized to form an anodic oxide layer 135, thereby improving the insulation of the gate electrode 117a (FIG. 6b).

Figure 6C:
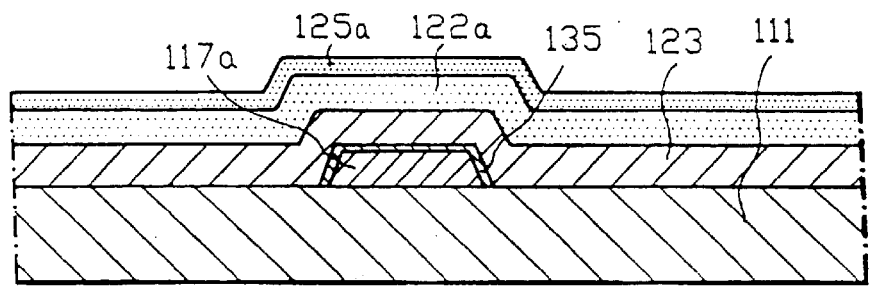
Figure 6D:
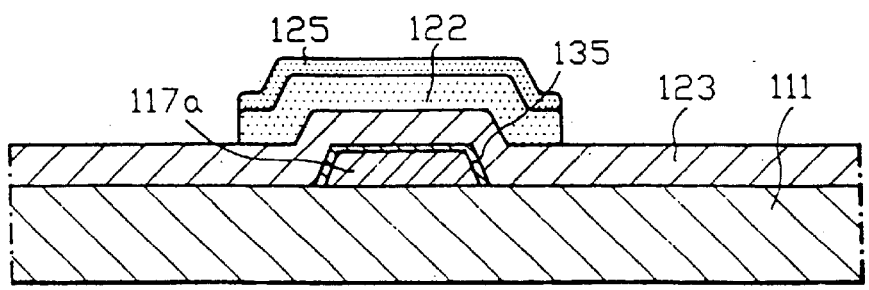

Next, an inorganic insulating layer 123 made of $SiN_x$ and/or $SiO_x$, amorphous silicon film 122a, and $n^+$ type amorphous silicon film 125a are sequentially deposited (FIG. 6c). Then, a photoresist is coated on the $n^+$ type amorphous silicon 125a and is developed into a predetermined pattern. According to the predetermined pattern of the photoresist, the amorphous silicon film 122a and the $n^+$ type amorphous silicon film 125a are simultaneously removed to form a semiconductor layer 122 and an ohmic contact layer 125 (FIG. 6d).

Figure 6E:
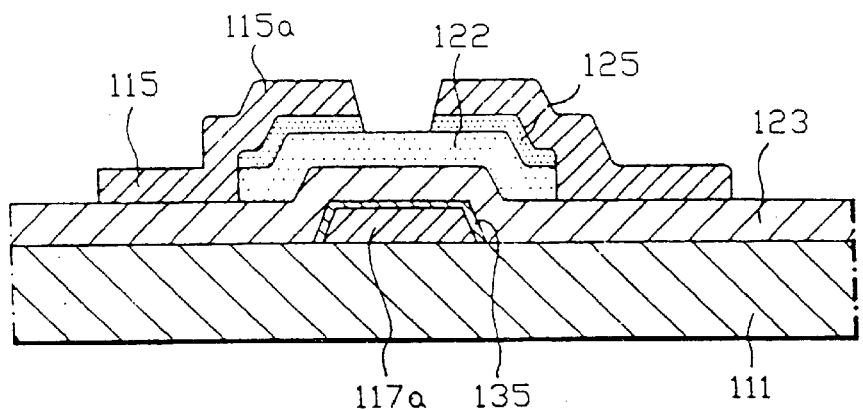

Thereafter, metal, such as chromium or aluminum, is deposited by sputtering on the overall surface. A photoresist is coated on the metal layer and is developed into a predetermined pattern. According to the predetermined pattern of the photoresist, the metal layer is removed to form a source electrode 115a branched off from a data bus line 115 and a drain electrode 115b. Using the source electrode 115a and the drain electrode 115b as a mask, the $n^+$ type amorphous silicon layer exposed between the source electrode 115a and the drain electrode 115b is removed (FIG. 6e).

Figure 6F:
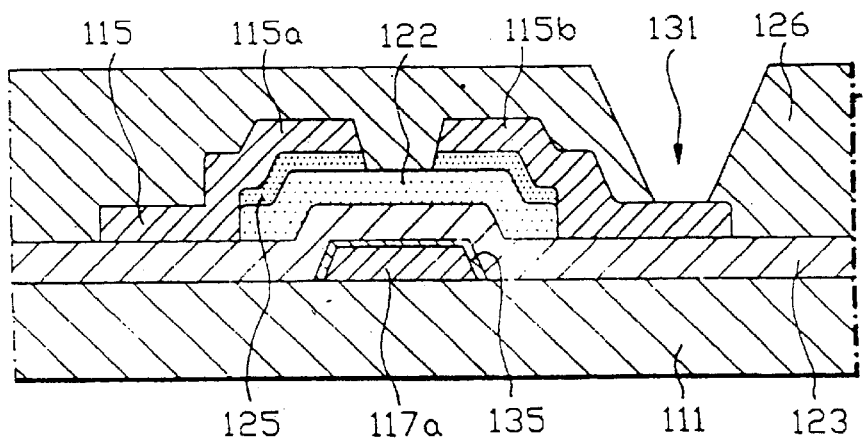

Then, an organic insulating material having a thermal expansion coefficient greater than that of indium tin oxide, such as a thermosetting resin including polyimide resin, acrylic resin, phenol, polyester, silicon or urethane; a thermoplastic resin, including polycarbonate, polyethylene, polystyrene, and siloxane polymers and spin on glass (SOG); as well as the organic materials listed in Table 1, such as benzocyclobutene (BCB), fluorinated polyimide, perfluorocyclobutane (PFCB) and fluoropolyaryether (FPAE), is coated on the overall surface to form a protection layer 126. The thermal expansion coefficients of some of these materials are as follows; BCB, $50–60\times10^{-6}/°$ C.; polyimide, $40–60\times10^{-6}/°$ C.; acrylic resin, $40–70\times10^{-6}/°$ C.; siloxane polymer, about $40\times10^{-6}/°$ C.; SOG, about $40\times10^{-6}/°$ C. A photoresist is coated on the protection layer 126 and is developed into a predetermined pattern. According to the predetermined pattern of the photoresist, a portion of the protection layer 126 is removed to form a first contact hole 131 (FIG. 6f). The first contact hole is formed over the drain electrode 115b. When the protection layer 126 is made of a photo-sensitive BCB, the step of coating a photoresist may be eliminated.

TABLE 1

Dielectric Constant of organic materials

| Organic material | Dielectric constant | Structure |
|---|---|---|
| Fluorinated polyimide | 2.7 | |
| Teflon | 2.1–1.9 | |
| Cytop | 2.1 | |
| BCB | 2.7 | |
| Fluoropoly-arylether | 2.6 | |
| Fluorinated para-xylene | 2.4 | |

The organic protection layer has a smaller relative dielectric constant as compared with an inorganic protection layer. Therefore, a parasitic capacitance arising at an overlapped portion between the data bus line and a pixel electrode becomes small, thereby reducing the possibility of voltage distortion and cross-talks between adjacent pixels due to a leak current. On the other hand, when the protection layer is made of an inorganic material, a large parasitic capacitance is created between the data bus line and the pixel electrode, since the inorganic protection layer has a large relative dielectric constant, which results in voltage distortion and cross-talks.

Moreover, since the organic protection layer 126 provides a smooth surface, a uniform cell gap results, and defects during rubbing an orientation film to be formed on the pixel electrode are eliminated. Thus, the organic protection layer enables a liquid crystal display to have a higher aperture ratio and a uniform cell gap.

Figure 6G:
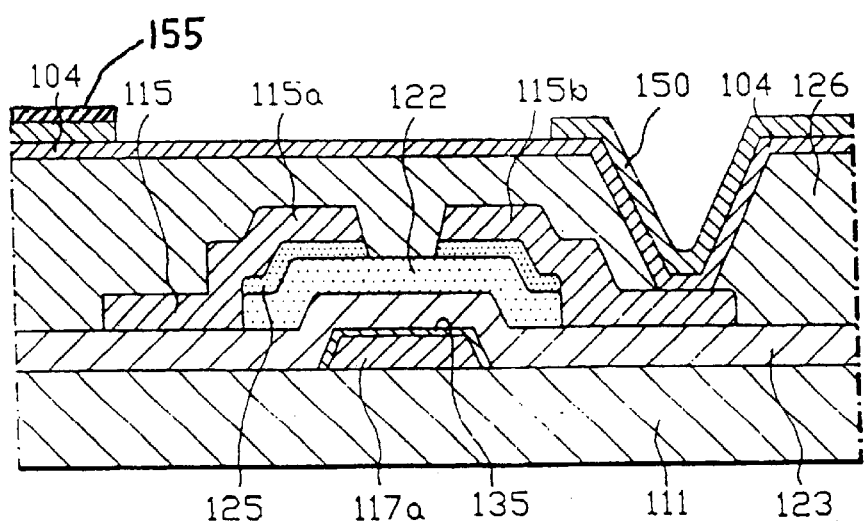

Referring to FIG. 6g, indium tin oxide 104 having a thermal expansion coefficient ($5-7 \times 10^{-6}/°$ C.) less than that of the organic protection layer and a second protection layer 150, such as $SiN_x$ and/or $SiO_x$, having a similar or less value in thermal expansion coefficient ($0.1-7 \times 10^{-6}/°$ C.) to that of the indium tin oxide and having an etch rate greater than indium tin oxide, are sequentially vacuum-deposited on the organic protection layer 126. A photoresist 155 is coated on the second protection layer 150 and is developed into a desired pattern. According to the developed pattern of the photoresist, the second protection layer 150 is removed (FIG. 6g). The patterned second protection layer 150 is formed to overlap the gate bus line so as to increase the area of a pixel electrode to be formed.

Figure 6H:
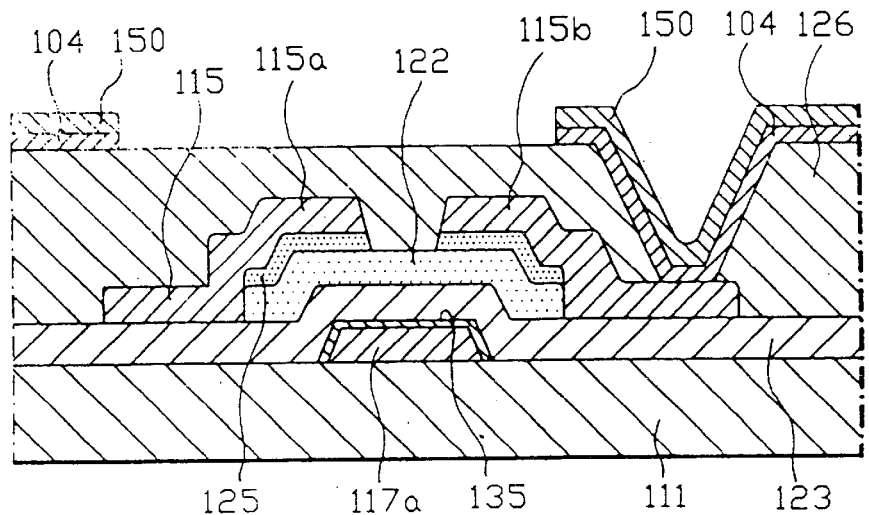
Figure 6I:
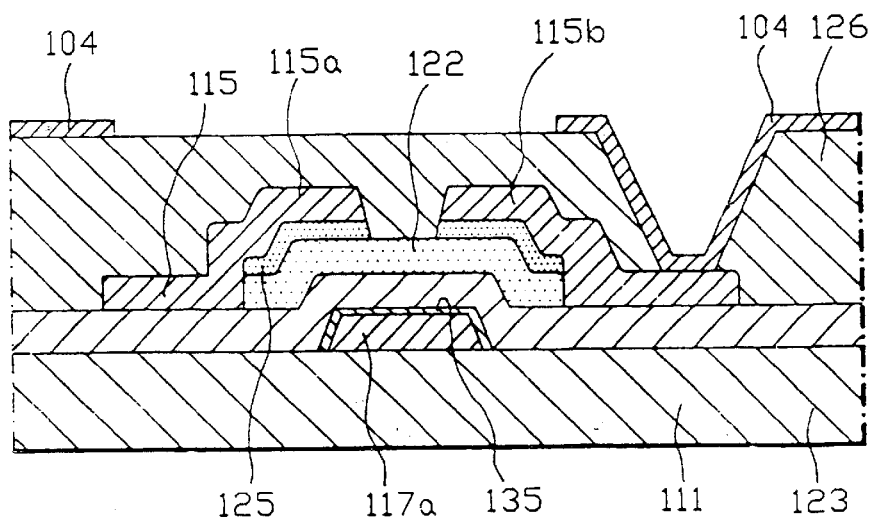

Portions of the indium tin oxide layer are removed to form a pixel electrode 104 using the patterned second protection layer as a mask (FIG. 6h). Subsequently, the second protection layer remaining on the pixel electrode is removed (FIG. 6i). Therefore, it is possible to prevent micro-crack formation in the pixel electrode during the patterning step, thereby eliminating the CD loss of the pixel electrode.

It will be apparent to those skilled in the art that various modifications and variations can be made in the liquid crystal display and the method of manufacturing the same of the present invention without departing from the spirit or scope of the invention. Thus, it is intended that the present invention cover the modifications and variations of this invention provided they come within the scope of the appended claims and their equivalents.

What is claimed is:

1. A method of manufacturing on a substrate a liquid crystal display having a gate bus line, a data bus line, and a switching element with a drain electrode, the method comprising the steps of:

forming a protection layer over the substrate to cover the gate bus line, the data bus line, and the switching element;

depositing a first layer on the protection layer, the first layer having a thermal expansion coefficient smaller than that of the protection layer;

depositing a second layer on the first layer, the second layer having a thermal expansion coefficient that is substantially the same as that of the first layer;

depositing a photoresist layer on the second layer, the photoresist layer being developed into a desired pattern;

removing portions of the second layer on the first layer to form a desired pattern of the second layer using the photoresist layer as a mask;

removing portions of the first layer using the patterned second layer as a mask to form a desired pattern of the first layer; and removing the second layer remaining on the patterned first layer.

2. The method according to claim 1, further comprising, before the step of depositing the first layer, the step of removing a portion of the protection layer to define a drain contact hole in the protection layer exposing a portion of the drain electrode of the switching element.

3. The method according to claim 1, wherein the step of forming the protection layer includes the step of depositing an organic insulating material over the substrate.

4. The method according to claim 3, wherein the step of depositing the organic material includes the step of depositing at least one of polyimide resin, acrylic resin, thermosetting resin, and thermoplastic resin.

5. The method according to claim 3, wherein the step of depositing the organic material includes the step of depositing at least one of benzocyclobutene, fluorinated polyimide, perfluorocyclobutane, and fluoropolyarylether.

6. The method according to claim 3, wherein the step of depositing the organic insulating material includes the step of depositing a photo-sensitive organic material.

7. The method according to claim 1, wherein the step of forming the protection layer includes the step of forming spin on glass (SOG).

8. The method according to claim 1, wherein the step of depositing the first layer includes the step of depositing indium tin oxide.

9. The method according to claim 1, wherein the step of depositing the second layer includes the step of depositing at least one of $SiN_x$ and $SiO_x$.

10. The method according to claim 9, wherein the step of depositing the first layer includes the step of depositing indium tin oxide.

11. The method according to claim 1, wherein the step of depositing the second layer includes the step of depositing the second layer that has a thermal expansion coefficient smaller than that of the first layer.

12. The method according to claim 1, wherein the second layer is a nonphotosensitive layer.

* * * * *